Oct. 11, 1932.    G. CAMPBELL    1,882,062
LIQUID RELIEF APPARATUS
Original Filed Jan. 5, 1925
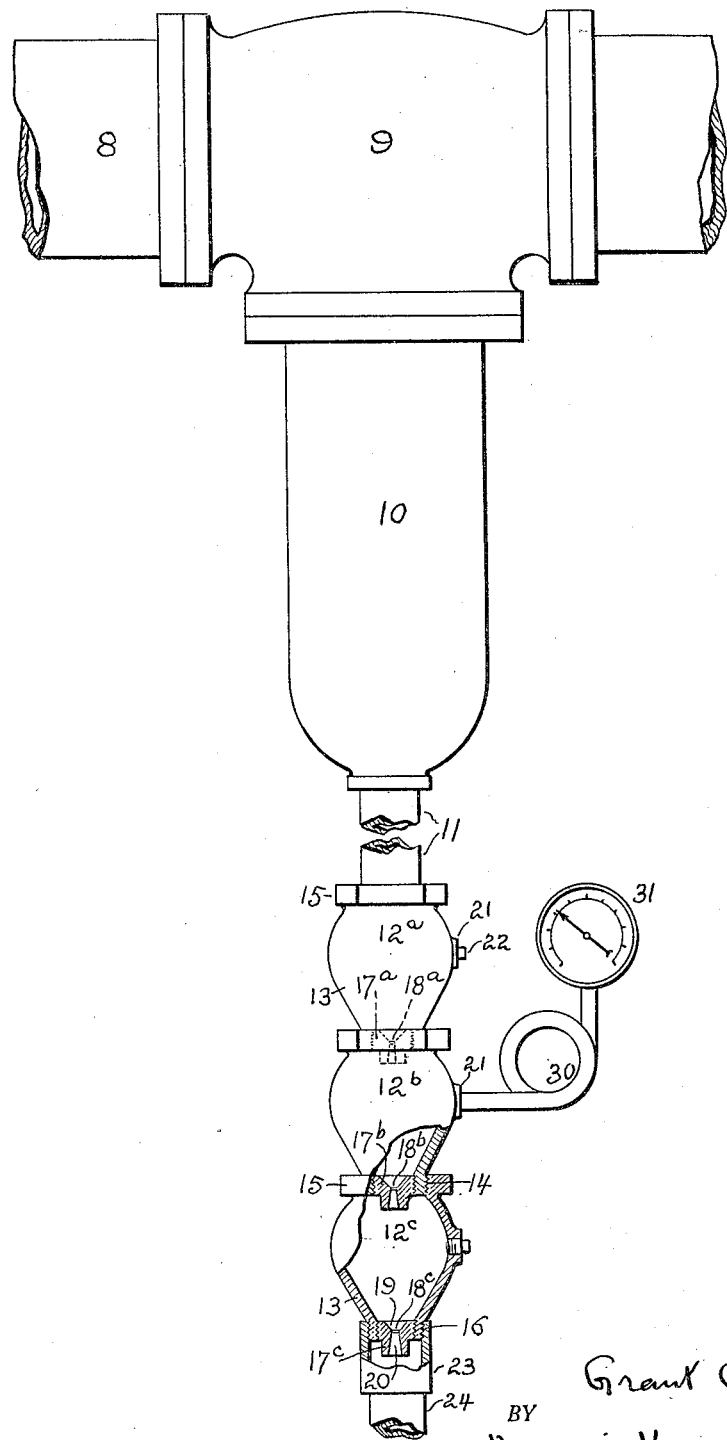
INVENTOR.
Grant Campbell
BY Morrison, Kennedy & Campbell
ATTORNEYS.

Patented Oct. 11, 1932

1,882,062

UNITED STATES PATENT OFFICE

GRANT CAMPBELL, OF SHORT HILLS, NEW JERSEY

LIQUID RELIEF APPARATUS

Original application filed January 5, 1925, Serial No. 670, and June 13, 1925, Serial No. 36,928. Divided and this application filed August 25, 1928. Serial No. 302,025.

This invention is a novel liquid relief apparatus, or means for trapping or discharging condensate or other liquid accumulated from vapors or other gases. The invention is available in a very extended field of utility but is herein shown, for purposes of illustration, in a form adaptable for the trapping and discharge of water condensed out of steam, traveling for example from a boiler to a prime mover.

The general object of the invention is to afford a liquid relief apparatus which will be highly efficient in action and yet extremely simple in construction, so much so in fact that no moving parts are essential or shown in the illustrated embodiment. A further object is to afford such apparatus which can be readily calculated and designed for a given duty and will thereafter require the minimum of attention, since no adjustment will be necessary and there are no moving parts to get out of order.

The general principle of the invention is to employ for the relief of excess liquid or condensate a simple orifice system, constantly open, taking advantage of the laws of orifice flow so that the discharge, of liquid or gas, is self controlled by the condition of the fluid present, resulting in a high rate of discharge by weight when liquid is present or in excess but a negligibly low and restricted flow and discharge when only gas is present.

To the attainment of the objects and advantages referred to the present invention consists in the novel liquid relief apparatus and the novel features of operation, combination, arrangement and structure herein illustrated or described.

In the single figure of the drawing, forming a part hereof, is diagrammatically shown, substantially in elevation, and partly broken away to show the interior, a liquid relief apparatus embodying the present invention.

This application is a division of my prior application Serial No. 36,928, filed June 13, 1925 patented Jan. 1, 1929, No. 1,697,341 for orifice element and system and apparatuses utilizing the same, this division being based on Fig. 1 of application 36,928 and the description thereof pertaining to the same, which description may be referred to for any features of construction and operation not herein fully described. The present application is also a division of my prior application Serial No. 670, filed January 5, 1925, for liquid relief apparatus and method, patented Jan. 1, 1929, 1,697,343. This refers to so much of said application 670 as includes the parts designated by reference numbers 25 to 46 inclusive, and the description thereof of said parts as they may be used without the other parts numbered 47 to 58 inclusive, said application 670 having been limited to include the last mentioned parts or their equivalents, while the reduced apparatus comprising only the former parts is made the subject of the present application.

The pipe 11 leading to the orifice system may be drawn from the lower side of any passage or chamber containing steam or other vapor or gas from which it is desired to remove or relieve liquid or condensate. For example, a steam main 8 is shown in which is interposed a T 9 from which depends the usual drip pocket or chamber 10, or any known separator, employed in connection with traps or relief apparatuses. The pipe 11 is shown extending downwardly from the drip pocket 10 and its lower end is threaded for connection to the relief apparatus or system constituting the present invention.

A series or system of units or elements $12^a$, $12^b$ etc., which I term "orifice elements", are interconnected with each other and with the lower end of the pipe 11. While three such elements are shown there may be four or only two or other number, preferably plural.

The orifice elements are shown connected in succession or tandem and they may conveniently consist of identical units suitably constructed for tandem interconnection. Each orifice element is in the nature of a chamber, the wall 13 of which is of bulging or pear shape and having a threaded entrance portion 14 engageable with the threads of the preceding element or the pipe 11. Each element has a hexagonal or other flange 15 for assembling purposes and the lower or exit end 16 of each is shown threaded both exteriorly and interiorly, the exterior threads being engageable with the interior threads of the entrance 14 of the succeeding element while the interior threads are adapted to receive an orifice piece or nozzle $17^a$, $17^b$ etc., suitably threaded, and formed with orifices or discharge apertures $18^a$, $18^b$ etc. By the term "orifice" it is not intended to designate a single aperture, as a plural number, or even a multiplicity, of smaller apertures may give the equivalent action, namely a progressive gradual escape of fluid from the orifice element or chamber; and in some cases an elongated orifice or tube may be equivalently used, affording a variable restrictive effect.

The orifice nozzles are removable and interchangeable so as to permit the making up of a relief apparatus to meet any desired conditions. Thus the drawing shows successive orifice nozzles having effective apertures of increasing area, giving certain advantages in the operation of the apparatus. Each orifice nozzle is shown as having a tapered approach 19 and a flared getaway 20 but they may be of different known forms, such as a simple apertured disk, or a restrictive tube.

The several orifice elements $12^a$ etc. are shown formed with tapered bosses 21 on the chamber wall 13, each of which may be closed with a plug 22 as shown in the first element or may be employed for connection of a gage, for example by means of a pigtail connection 30 to a pressure gage 31. The threaded lower end or exit of the final or lowest orifice element $12^c$ may be connected as shown by any usual fitting or coupling 23 with a discharge pipe 24 leading to waste or to a hot well or other point of disposal of the discharged fluids.

The described assemblage affords a simple and positive liquid relieving or trapping device. The liquid or water present is completely discharged at the final or lowest exit after accumulating in each unit and being forced through the successive nozzles. Only a minor or negligible amount of gas or steam is permitted to escape at times when there is no liquid present. The discharges from unit to unit are at successively decreasing stages of pressure from the initial pressure in pipe 11 to the final discharge pressure. At each stage the pressure drop is only a fraction of the entire pressure drop and the successive orifices effectively discharge any accumulated water, while effectively controlling and limiting the amount of steam passed through from unit to unit.

Owing to the progressively lower pressures in the successive units reevaporation of liquid readily takes place, when the liquid is received at sufficiently high temperatures; and the use of a plurality of units in tandem affords maximum reevaporation. In this way clean low pressure steam may be finally delivered from the apparatus and may be available for heating or other purposes. The entire operation is automatic and self adjusting to changes of conditions, and removal of water is completely effected. Compared with steam traps heretofore known the present device is superior in that no moving parts or adjustments are required; it is low of cost, readily assembled, attached and used, and repair costs are substantially eliminated.

The most advantageous number and size of units, and the sizes of orifices, for any given conditions, are readily determined by consideration of the initial steam pressure and the approximate quantity of liquid expected to be discharged. The successive orifices may be of the same size, but are preferably arranged with progressively increasing sizes as indicated. Thereby the first nozzle, having the smallest orifice, and controlling the total discharge rate, causes the main drop of pressure in the system; the subsequent nozzles progressively lowering the pressure until the final nozzle discharges into the lowest pressure of the system which may usually be atmospheric pressure.

The gage 31 will indicate the pressure in one of the intermediate orifice chambers, for example in the chamber between the first and second orifices. Knowing the initial and intermediate pressures and the size of the orifices the relative rate of flow through the system is determinable, by formula, or by special calibration of the gage.

The action of the tandem orifices with distinct chambers between them may be further described as follows, it being understood that the orifice system may either receive from a pressure line or discharge to a suction line. The three orifices shown have two chambers between them and cause three stages of pressure drop, the flow at each orifice depending on the effective area of the orifice and the pressure above and below it. The system preferably trends downwardly so that any water present quickly reaches the orifices and is discharged; the liquid flowing ahead of the gas minimizes waste. In the case of hot condensate the water will usually be partly or wholly reevaporated during its passage to the final discharge so that much steam is afforded for collateral uses, heating, etc.

Successive orifices of increasing size give improved results. The successive pressure drops may be substantially equalized. Thus if 42% drop in absolute pressure is desired in passing through each nozzle the orifice areas may be successively 72% larger, more or less, as roughly indicated. This is calculated as follows. 42% drop of absolute pressure means in the ratio of 1 to .58, or a volume increase to 1 divided by .58, or 1.72, an increase of 72%. The successive orifices are therefore 72% larger progressively to take care of the progressively increasing volume of gas. With an initial steam pressure of 59.6 pounds per square inch, for example, three orifices of approximate areas .019; .033; and .058 will discharge steam at atmospheric pressure, assuming no liquid present, at the rate of about 74 pounds per hour, and about the same percentage of pressure drop at each stage. In the case of higher pressures such as 113.4 pounds there may be an additional orifice at the low pressure end of .099 area, and discharge at the rate of 128 pounds per hour.

In any case the presence of the water to be removed excludes the passage of steam, and the system can be calculated to take care of the water under all circumstances while minimizing the waste of steam. The flow of water through the system is of course at a much greater rate in pounds than the flow of steam, making the invention very effective for relief purposes.

The pressure gage 31 may indicate the conditions in the apparatus on the following principles. The rate of flow of the steam through an orifice into a pressure not greater than 58% of the initial absolute pressure may be considered as a direct function of such initial pressure, while on the other hand, the rate of flow of water, not hot enough to reevaporate, through an orifice is a direct function of the square root of the difference in pressures. If then steam only is present in the system and the orifices are proportioned as above indicated, the pressure gage will stand at a definite point, for example 42% of the absolute pressure in the previous stage, which may be the boiler pressure. Therefore the gage, when standing at this point, will indicate the absence of water.

On the other hand with only cold water in the system, since the rate of flow must be the same through each stage or chamber, the absolute pressure drop through the successive nozzles will be about in the ratio of 3 to 1. This is calculated from the knowledge that the flow is a function of the square root of the pressure drop multiplied by the orifice area. The orifices increase progressively in the proportion of 1 to 1.72, calculation shows that the pressure drop through successive nozzles is as 2.96 to 1 or about 3 to 1. Therefore the initial pressure, assumed as 59.6 pounds, must represent the total cold water pressure drop through the three nozzles. The successive drops through the three nozzles are in the ratio of 9 to 3 to 1, and apportioning the total drop will give successive drops of about 41 then 14 then 5. With only cold water therefore the successive pressures will be about 59.6 then 18.2 then 4.5 then 0; whereas with only steam the successive pressures will be about 59.6 then 28.4 then 10.6 then 0. As stated therefore the pressure gage, applied at any intermediate stage, will indicate the conditions.

When a mixture of steam and water is passing through the system, or when the water is hot enough to reevaporate at one or more stages, different intermediate effects are produced, also indicated by the gage.

The vertical drop or head between the steam vessel or main and the first orifice is of value as it utilizes gravity to increase the pressure and flow rate when the liquid collects rapidly and is in great excess, while relaxing when the liquid is nearly discharged, thus delaying the escape of gas. The additional head and accumulation of condensate further allows more cooling and therefore less retarding by reevaporation beyond the first orifice.

The invention in one aspect may be described as an apparatus or relief device for discharging condensate or other liquid from a vessel carrying gas or vapor under pressure, the same comprising an orifice system arranged to receive the liquid and having walls enclosing one or more chambers and with successive and constantly open orifices of unchanging restrictive character; whereby when the liquid only is received by the orifice system it traverses the same at a relatively high rate by weight, but when the vapor only is received it traverses the system at but a relatively negligible rate by weight due to the natural restriction of orifice flow of gases. According to the employment and conditions prevailing the liquid or condensate may be in a cold or in a hot condition. When sufficiently hot for reevaporation in any chamber the liquid discharged into such chamber will be subject to retarding by the increased back pressure due to reevaporation. In any case preferably the receiving passages preceding the first orifice, namely the chamber 12$^a$, the pipe 11 and drip connection from the steam main, are of substantial volume and have substantial vertical drop to the orifice. The approach to each orifice is located at the lower portion of the chamber preceding the orifice whereby the liquid discharge trends downward by gravity. Another preferred feature is that an orifice preceding the final one is of substantially smaller effective area than the final one; in fact the successive orifices are progressively larger from the first to the final one.

There has thus been described a liquid relief apparatus embodying the principles and attaining the objects of the present invention. Since many matters of operation, combination, arrangement and structure may be variously modified without departing from the principles involved it is not intended to limit the invention to such matters except so far as specified in the appended claim.

What is claimed is:

Relief apparatus for removing hot condensate water from a vessel carrying water and steam under pressure, comprising a passage connecting the pressure vessel to an orifice system and adapted to conduct the hot water downwardly to the orifice system and to communicate the steam pressure thereto, and an orifice system arranged to receive such hot water and steam pressure and having walls enclosing vaporization chambers having constantly open inlet orifices of scientifically predetermined constant restrictive character; whereby at times when water is received by the orifice system it traverses the same at a relatively high rate by weight due to the steam pressure, whereas when steam only is received it traverses the orifice system and is discharged at a relatively negligible rate by weight due to the natural restriction of orifice flow of gases; and the successive orifices being of progressively increasing predetermined effective areas, whereby when hot liquid is received by the orifice system it passes through the successive orifices into chambers of progressively decreasing pressures and reevaporates partly or wholly following each such passage.

In testimony whereof, this specification has been duly signed by.

GRANT CAMPBELL.